Oct. 29, 1968 E. A. WINSTON 3,407,523

IDENTIFICATION DEVICE

Filed Sept. 1, 1966

INVENTOR.
EMANUEL A. WINSTON

BY Dominik, Stein & Knechtel

ATTORNEYS

United States Patent Office 3,407,523

Patented Oct. 29, 1968

3,407,523

IDENTIFICATION DEVICE

Emanuel A. Winston, 2925 W. Touhy Ave., Chicago, Ill. 60645

Filed Sept. 1, 1966, Ser. No. 576,672

3 Claims. (Cl. 40—1.5)

ABSTRACT OF THE DISCLOSURE

An identification tag consisting of a translucent plastic holder, a disc with ID information thereon visible through one side of the holder and a reflector which locks the disc to the holder in a waterproof manner.

This invention relates to an identification device which functions both as an identification tag and as a reflector for safety in darkness.

The identification device of the present invention, generally, has a faceted reflector which is removably affixed within a transparent non-corrosive holder. A disc having identification information such as name, address, and telephone number is retained within the holder, between the holder and the reflector, in a fashion such as to be readily readable. The holder is adapted to be removably affixed to a child's clothing, a pet, toys, luggage and the like.

The identification device is particularly useful with children and pets because it provides both a means of identification and a factor of safety in darkness. Also, being of a non-corrosive material, it is unaffected by the elements. The construction of the device further is unique since it combines the reflector and the translucent holder in a fashion such that the identification disc can be easily removed and so that the identification disc can be read without removing it from the holder. Accordingly, the identification device has the following, as well as other, features which most existing similar types of identification devices do not have:

(1) It reflects for protection in darkness.

(2) A party purchasing the identification device can himself write his name, address, telephone number and the like on the identification disc.

(3) The information on the identification disc can be easily changed.

(4) It need not be ordered with the above information inscribed on it, as is usually the case with existing identification devices of metal, plastic or the like, hence the delay of ten days to two weeks for delivery is eliminated.

Accordingly, it is an object of the present invention to provide an improved identification device and in particular an identification device which functions both as an identification tag and as a reflector for safety in darkness.

Another object is to provide an identification device of the above type which may be constructed of a non-corrosive material so that it is unaffected by the elements. In this respect, it is further contemplated that the identification device be water-proof.

Still another object is to provide an identification device of the above type which is constructed in a fashion such that an identification disc retained therein can be read without removing it and so that the identification disc can be easily removed for inscribing it.

Still another object is to provide an identification device of the above type which may be easily manufactured and assembled inexpensively, in comparison to most presently existing identification devices.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

Figures 1, 2, 3, 4:
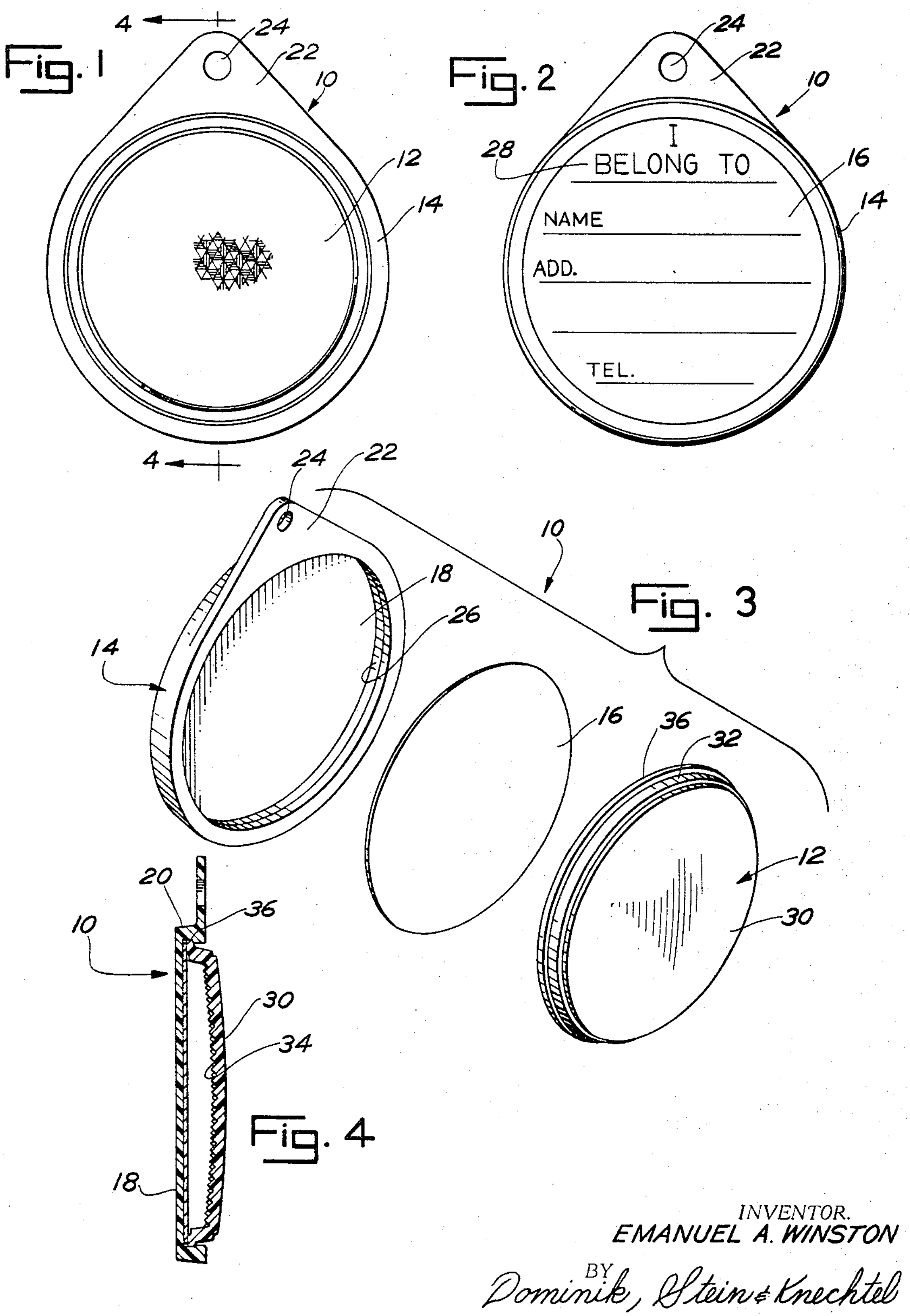
FIG. 1 is a front plan view of the identification device of the present invention.
FIG. 2 is a rear plan view of the identification device of FIG. 1.
FIG. 3 is an exploded perspective view of the identification device of FIG. 1.
FIG. 4 is a sectional view, taken along lines 4—4 of FIG. 1.

Referring now to the drawing, there is illustrated an identification device 10 including a reflector 12, a back or holder 14 and a disc 16 which is retained within the holder 14, between the holder 14 and the reflector 12.

The holder 14 has a body portion 18 which is preferably circular in shape and an annular rim 20 about the body portion 18. An extension 22 which is generally triangular shaped and has an aperture 24 therein is integrally formed with the rim 20 so as to extend outwardly in a plane substantially parallel to the body portion 18. An annular slot or groove 26 is formed in the rim 20 interiorly of the holder 14. The holder 14 is fabricated of a translucent or transparent material and is preferably of a flexible plastic such as polyethylene so that it can be easily and inexpensively molded. Also, being of a flexible plastic, it is not as susceptible to breakage as it would be if it were manufactured of glass, a rigid plastic or a similar material. Furthermore, the flexibility of the plastic permits the reflector 12 to be snap-fitted therein, in a manner described below.

The disc 16 is preferably of paper, although other materials may be used and may advantageously have indicia 28 such as the legend, "I belong to," and an indication as to the name, address and telephone number of the owner on one or both sides of it. The disc 16 preferably has a diameter which substantially corresponds to the inner diameter of the rim 20 so that the disc 16 can be fixedly retained in position within the body portion 18, by means of the peripheral edge of the reflector 12, as illustrated in FIG. 4.

The reflector 12 has a body portion 30 which is generally concave shaped and an annular rim 32. The interior surface 34 of the body portion 30 is faceted in the well-known manner to reflect light impinged upon the exterior surface of the body portion 30, and an outwardly projecting lip 36 is formed about the peripheral edge of the rim 32, which lip 36 is adapted to be snap-fitted within the annular groove 26 in the rim 20, for both retaining the reflector 12 within the holder and for retaining the disc 16 in position therein. The lip 36 should fit snugly within the groove 26 so that a water-proof seal is provided.

The identification device 10 is assembled by inserting the disc 16 within the holder 14 and then snap-fitting the reflector 12 within the holder 14 by lockingly engaging the lip 36 within the groove 26. The disc 16 is easily removed for inscribing it with identification or other matter simply by flexing the annular rim 20 of the holder 14 so as to disengage the lip 36 from the groove 26. This may be most easily done by holding the identification device 10 in one hand and then grasping the extension 22 with the fingers of the opposite hand and flexing it away from the reflector 12. The reflector 12 will "pop out" of the holder 14. After inscribing the desired information on the disc 16, the identification device 10 is reassembled in the manner described above. It can therefore be seen that the disc 16 of the identification device 10 can be easily and quickly removed for inscribing or modifying information on the disc 16. Also, by inserting the disc 16 within the holder 14 with the information inscribed thereon facing the body portion 18 of the holder 14, the information can be easily read without removing it from the holder 14 since the latter is of a translucent or transparent material.

The identification device 10 can be easily affixed to a child's clothing, a pet, toys, luggage and the like by extending through the aperture 24 formed in the extension 24 thereof.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention, herein described, and all statements of the scope of the invention, which, as a matter of language, might be said to fall therebetween.

Now that the invention has been described, what is claimed as new and desired to be secured by Letters Patent is:

1. An identification device comprising, in combination: a holder formed of a translucent flexible plastic with a body portion having an upstanding rim integrally formed therewith about its peripheral edge, said rim having a groove therein and an extension with an aperture therein integrally formed with said rim at one point about its peripheral edge, said extension extending outwardly in a plane substantially parallel with said body portion, a reflector having an upstanding rim about its periphery and a lip about said rim which is adapted to removably and lockingly engage with said groove in said rim about said body portion of said holder to removably affix said reflector to said holder and to provide a water-tight seal, and a disc adapted to have identifying indicia inscribed thereon retained sandwiched between said holder and said reflector, said holder being of a translucent plastic permitting said identifying indicia to be read through said holder so that said disc need not be removed from said holder to read the same.

2. The ientification device of claim 1 wherein the interior face of said reflector is faceted.

3. The identification device of claim 1 wherein said holder, said reflector and said disc are circular-shaped.

References Cited

UNITED STATES PATENTS

| | | | |
|---|---|---|---|
| 1,853,902 | 4/1932 | Kaplan | 40—156 |
| 2,214,030 | 9/1940 | Pereles. | |
| 3,295,237 | 1/1967 | Rooney | 40—16 |
| 3,344,543 | 10/1967 | Griffin et al. | 40—1.5 |

FOREIGN PATENTS

| | | | |
|---|---|---|---|
| 1,107,865 | 8/1955 | France. | |

EUGENE R. CAPOZIO, *Primary Examiner.*

W. J. CONTRERAS, *Assistant Examiner.*